US010621434B2

(12) United States Patent
McKenna et al.

(10) Patent No.: US 10,621,434 B2
(45) Date of Patent: Apr. 14, 2020

(54) IDENTIFICATION AND LOCALIZATION OF ANOMALOUS CROP HEALTH PATTERNS

(71) Applicant: International Business Machines Corporation, Armonk, NY (US)

(72) Inventors: Sean A. McKenna, Blanchardstown (IE); Beat Buesser, Ashtown (IE); Seshu Tirupathi, Phoenix Park Racecourse (IE)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/879,739

(22) Filed: Jan. 25, 2018

(65) Prior Publication Data

US 2019/0228223 A1 Jul. 25, 2019

(51) Int. Cl.
*G06T 7/00* (2017.01)
*G06K 9/00* (2006.01)

(52) U.S. Cl.
CPC ............ *G06K 9/00657* (2013.01); *G06T 7/00* (2013.01); *G06T 7/0002* (2013.01);
(Continued)

(58) Field of Classification Search
CPC .............. G06K 9/00657; G06T 7/0002; G06T 2207/30188
See application file for complete search history.

(56) References Cited

U.S. PATENT DOCUMENTS 6,366,681 B1 * 4/2002 Hutchins .............. G06K 9/0063
382/110
6,401,041 B1 * 6/2002 Petersen ................ G06F 16/904
702/5

(Continued)

OTHER PUBLICATIONS

William D. Penny (Editor), Karl J. Friston (Editor), John T. Ashburner (Editor), Stefan J. Kiebel (Editor), Thomas E. Nichols (Editor) "Statistical Parametric Mapping: The Analysis of Functional Brain Images 1st Edition", SBN-13:978-0123725608, , Chapter 1, Nov. 2, 2016, pp. 1-74.

(Continued)

*Primary Examiner* — Santiago Garcia
(74) *Attorney, Agent, or Firm* — Scully, Scott, Murphy & Presser, PC; Kurt P. Goudy, Esq.

(57) ABSTRACT

A method and system for generating a map identifying the size and location of anomalous crop health patterns of a geographic area. Predictive crop health forecasting based historical crop health images generates expected crop health images. Statistical parametric mapping is used to model differences in the expected crop health images and current crop health images to generate a statistical parametric map. Regions of anomalous crop health based on the modeled differences are identified in the statistical parametric map. The number of the identified anomalous crop health regions and the size of each of the identified anomalous crop health regions are determined. The statistical significance of the size and number of the anomalous crop health regions relative to the expected crop health is quantified. A map of anomalous crop health patterns delineates the anomalous crop health regions and the statistical significance of the size and number of anomalous crop health regions.

15 Claims, 6 Drawing Sheets

(52) U.S. Cl.
CPC .............. *G06T 2207/10024* (2013.01); *G06T 2207/10032* (2013.01); *G06T 2207/20076* (2013.01); *G06T 2207/20081* (2013.01); *G06T 2207/30188* (2013.01)

(56) References Cited

U.S. PATENT DOCUMENTS

| | | | |
|---|---|---|---|
| 6,529,615 | B2 | 3/2003 | Henrickson et al. |
| 7,058,197 | B1 | 6/2006 | McGuire et al. |
| 7,103,451 | B2 | 9/2006 | Seal et al. |
| 7,184,859 | B2 | 2/2007 | Hood et al. |
| 7,725,233 | B2 | 5/2010 | Hendrickson et al. |
| 8,135,178 | B2 | 3/2012 | Hendrickson et al. |
| 8,520,891 | B2 | 8/2013 | Scharf et al. |
| 8,731,836 | B2 * | 5/2014 | Lindores ................ G01D 18/00 702/2 |
| 2001/0036295 | A1 * | 11/2001 | Hendrickson ......... G01J 3/2803 382/110 |
| 2012/0155714 | A1 * | 6/2012 | Douglass ........... G06K 9/00657 382/110 |
| 2012/0169498 | A1 * | 7/2012 | Leppanen .......... G06K 9/00657 340/540 |
| 2014/0035752 | A1 * | 2/2014 | Johnson ................ A01G 22/00 340/601 |
| 2014/0312165 | A1 * | 10/2014 | Mkrtchyan ............ B64D 47/08 244/13 |
| 2015/0294154 | A1 * | 10/2015 | Sant ................... G06K 9/00651 382/110 |
| 2015/0324648 | A1 * | 11/2015 | Wilson .................... G06T 7/536 382/104 |
| 2016/0180473 | A1 | 6/2016 | Groeneveld |
| 2016/0216245 | A1 * | 7/2016 | Sutton ................ G01N 33/0098 |
| 2016/0223506 | A1 * | 8/2016 | Shriver .............. G01N 33/0098 |
| 2016/0239709 | A1 | 8/2016 | Shriver |
| 2017/0291704 | A1 * | 10/2017 | Alegria ................. B64C 39/022 |
| 2017/0351933 | A1 * | 12/2017 | Bleiweiss ............... G06T 17/05 |
| 2017/0374323 | A1 * | 12/2017 | Gornik .................. G06T 7/0004 |
| 2018/0129879 | A1 * | 5/2018 | Achtelik .................. G01C 5/00 |
| 2018/0174290 | A1 * | 6/2018 | Yoshida .................... G06T 7/80 |
| 2018/0330435 | A1 * | 11/2018 | Garg .................... G06Q 40/025 |
| 2019/0035071 | A1 * | 1/2019 | Klein .................... G06T 7/0004 |
| 2019/0050948 | A1 * | 2/2019 | Perry ................. G06K 9/00657 |
| 2019/0124859 | A1 * | 5/2019 | Larue ................... A01G 25/167 |
| 2019/0179009 | A1 * | 6/2019 | Klein .................... G01S 13/9005 |
| 2019/0228224 | A1 * | 7/2019 | Guo ................... G06K 9/00657 |
| 2019/0228225 | A1 * | 7/2019 | Guo ................... G06K 9/00657 |

OTHER PUBLICATIONS

McKenna, S.A. and Guitierrez, K., "Spatial-Temporal Event Detection in Climate Parameter Imagery", SAND2011-6876, Sandia National Laboratories, Albuquerque, NM, 2011.

Behmann, J., A.-K. Mahlein, T. Rumpf, C. Romer and L. Plumer, 2015, "A review of advanced machine learning methods for the detection of biotic stress in precision crop protection", Precision Agriculture, 16: 239-260.

* cited by examiner

IDENTIFICATION AND LOCALIZATION OF ANOMALOUS CROP HEALTH PATTERNS

BACKGROUND OF THE INVENTION

This disclosure is directed to computers, and computer applications for identifying crop health, and more particularly to computer-implemented methods and systems for generating a map identifying the size and location of anomalous crop health patterns of a geographic area.

Acquisition of geo-registered airborne imagery from various platforms with the goal of assessing crop health and/or crop growth or yield is known. There are several known approaches and tools developed to acquire and analyze crop health. However, the known techniques use some form of an empirical approach to utilize the results of the analysis to determine where crop health/growth is degraded and where it is not. Some current systems are focused on integrating the data, displaying the imagery and letting the determination of areas of anomalous crop health, whether good or bad, to be made by hand using the farmer's experience and expert judgment.

Examples of such current systems are Decision Support System for Agrotechnology Transfer (DSSAT) and Daisy. The crop simulation models in DSSAT simulate growth, development and yield as a function of the soil-plant-atmosphere dynamics. Daisy is a soil-plant-atmosphere system model designed to simulate water balance, heat balance, solute balance and crop production in agro-ecosystems subjected to various management strategies. DSSAT and Daisy employ mechanistic models and algorithms to forecast crop growth, yields and crop health.

Some current systems use color range in the imagery to present a qualitative assessment of anomalous crop health, which can often be misleading. There is no way in the current systems to separate what are real anomalies from regions of high/low crop health/growth that are still within expected or normal bounds. In addition, the current systems lack predictive modeling to understand expected behavior at times in the future Some known vegetation classification approaches rely on manual identification of a reference location or plot of healthy vegetation. In one known image analysis system, red appears to indicate areas of poor crop health and green is acceptable, but typically there is no color scale defining the values on the image and the actual difference between red and green is unknown.

SUMMARY OF THE INVENTION

One embodiment of a computer implemented method for generating a map identifying the size and location of anomalous crop health patterns of a geographic area includes storing historical crop health images of a geographic area in a computer data base and forecasting the expected crop health of regions within the geographic area based on the historical crop health images. In one embodiment, a forecasting algorithm is used to predict the expected crop health of regions. The forecasting is done with a predictive crop health forecasting computer modeling module to generate expected crop health images. The computer implemented method further includes obtaining current crop health images of the geographic area and using a statistical parametric mapping computer module to generate a statistical parametric map that defines differences in the expected crop health images and the current observed crop health images. Regions of anomalous crop health based on the modeled differences are identified in the statistical parametric map. In addition, computer implemented method includes determining the number of the identified anomalous crop health regions, determining the size of each of the identified anomalous crop health regions and quantifying the statistical significance of the size and number of the anomalous crop health regions relative to the expected crop health using the statistical parametric map. A geographic area map is generated of anomalous crop health patterns in which the map delineates the anomalous crop health regions and the statistical significance of the size and number of the anomalous crop health regions.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

Figure 1:
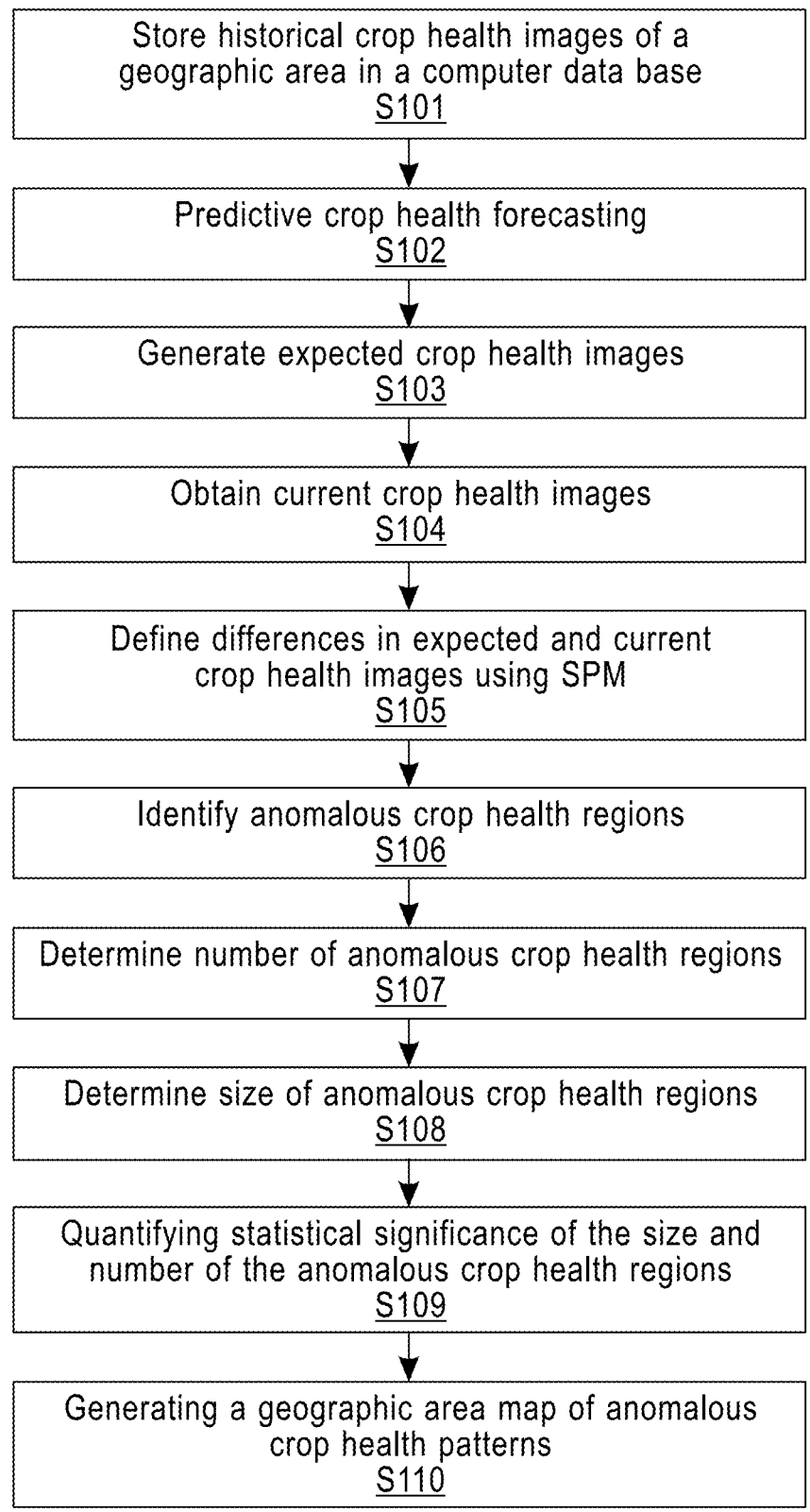
FIG. 1 is a flow diagram of one embodiment of the method for identifying anomalous crop health regions disclosed in this specification.

Crop health/growth forecasting is uncertain and dependent on a number of poorly measured variables. Crop health/growth is not uniform and variations in crop health within the scale of a single field make identification of significant variations difficult. The present method and system makes use of historical crop health imagery and new sensing platforms. The method and system eliminates, or minimizes, the need for field-based surveys to sample crops or identify reference regions of good crop health.

Variations in soil characteristics, slope, elevation, seeds, fertilizer and pesticide application, infestation, irrigation, soil moisture retention, etc. create expected variation in crop health across a field. The present method and system, in one embodiment, integrates historical and current imagery and accounts for expected spatial variation in crop health to identify regions of anomalous crop health/growth. The present method and system compares a crop health forecast to current crop health, identifies the locations of regions of degraded crop health, assigns significance to those regions and alerts the interested parties including providing a map of those locations.

The present method and system is an improvement over prior systems by determining what is a signal and what is noise and to identify statistically significant regions of degraded crop health. The present method and system couples tools for imaging of crop health with predictive models (physical, statistical, artificial intelligence) of crop health/growth. The present method and system utilizes images and models in a way that enables separation of signal from noise in the images to determine areas of concern and to assign a significance to those areas.

In one embodiment, present method and system identifies areas of anomalous crop health or growth from satellite, airborne, drone (UAV) or ground vehicle based imaging of crop health indices. In one embodiment, the present method and system provides locations of anomalous growth and the statistical significance of those regions relative to expected crop growth. The present method and system provides increased value for existing historical crop health imagery integrating it into forecasts of future crop growth for comparison against observed crop growth. The present method provides locations and timing of anomalous crop growth patterns and the statistical significance for the locations, magnitude, size (spatial) and timing of the anomalous crop growth patterns to separate signal from noise in images. The present method and system provides an information technology framework for the transmission and update of identified anomalies to the user and other interested parties.

The present method and system, in one embodiment, utilizes quantitative forecasts of crop health/growth based on prior data and other exogenous data (e.g. weather variables) through machine learning, statistical forecasting and/or artificial intelligence algorithms. The present method and system utilizes a measure of uncertainty in the quantitative forecasts of crop growth. The present method and system utilizes both historical and up-to-date imagery of crop health. The present method and system, in one embodiment, trains machine learning, statistical or artificial intelligence models to forecast crop health and quantify uncertainty Examples of statistical forecasting models include multiple regression models, autoregressive models (ARIMA, SARIMA, ARAMX, ARMA) and other time series and filtering approaches and combinations of any of the above models. Examples of machine learning forecasting models include support vector regression model, and generalized additive models. Examples of artificial intelligence forecasting models include recurrent neural networks and convolutional neural networks or other deep learning approaches.

The present method and system, in one embodiment, provides quantitative differences between forecasted and observed crop health, the statistical significance of the differences between forecasted and observed crop health and location and extent of the regions where crop health is significantly different than expected. The present method and system treats the difference between expected and observed crop health as a continuous spatial field and then thresholds that continuous field to identify anomalous regions.

The present method and system, in one embodiment, provides a modeling platform to integrate predictive model forecasts into the evaluation of crop health that relies on an existing database of crop health images covering multiple growing seasons. The present method and system includes a means of collecting geo-registered images of crop health from satellite, airborne, or ground-based platforms at a regular time interval and uniform resolution. The present method and system provides quantitative forecasts of crop health with a measure of confidence/uncertainty in the forecast by employing a predictive model to estimate the expected crop health/growth conditions at any given time in the future. The present method and system, in one embodiment, employs a predictive model that is continuously updated with observational data to provide a custom, up-to-date, forecast of crop growth for the specific time and location of the next observation. The predictive model provides an estimate of crop health/growth across the region of interest and quantifies the uncertainty in that forecast.

The present method and system, in one embodiment, employs statistical parametric mapping to identify areas of degraded crop health and assign significance to those areas. Statistical parametric mapping refers to the construction and assessment of spatially extended statistical processes used to test hypotheses about functional imaging data. The differences between forecast and observed crop health are defined in a statistical parametric map. In one embodiment, the statistical parametric mapping determines the location, intensity and size of anomalous regions. Inherent in the statistical parametric mapping approach is the determination of the spatial correlation of the differences between the observed and expected crop health. An outcome of the statistical parametric mapping approach is that the chances of observing a given size of an identified anomalous region under normal crop growth conditions, the significance, can be determined. This significance is a function of both the size and the intensity of the anomalous region. Additionally, use of the statistical parametric mapping process enables the determination of the significance of the number of anomalous regions.

Measuring and forecasting crop growth is not an exact science. Variations in the weather, soil conditions, seed quality, pests, disease, irrigation, and other factors make comparison of any observed crop growth against growth in previous time periods difficult. These variations lead to uncertainty in what can be considered normal vs. anomalous growth. Additionally, there is noise inherent in the measurements of crop growth from remote sensing imagery that also contributes to uncertainty in what is anomalous vs. normal. The present method and system addresses these uncertainties, in aggregate, through a statistical model and calculates statistical significance to determine the chance that any size, intensity or number of anomalies would occur under background growth conditions where background conditions encompass all of the variations and uncertainties mentioned above.

Advantages of the present method and system over the current known systems include identifying specific zones of anomalous crop health and providing geographic locations, and separating signal from noise using statistical parametric mapping. In addition, the present method and system does not require identification of a reference area of good crop health through field investigation, but does allow for any species of crop and different types of risk metrics. Further, the present method and system specifically calculates the probability, or statistical significance, of one, or more, geographic regions, those above or below a threshold, occurring under expected or normal health/growth conditions. The present method and system is different from any technique discussing significance at a pixel-wise (univariate) level.

The present method and system, in one embodiment, combines forecast health/growth as derived from one or more learning algorithms with observed health/growth to identify the location and extent of anomalous crop health and assigns a significance to that anomalous region. The present method and system utilizes existing, historical images of crop health and up-to-date (such as real time) images of crop health and engages a learning system to forecast expected crop health from information contained in existing images. The present method and system, in one embodiment, models differences in expected and imaged crop health as a spatially correlation, multivariate random field that can include: F, t, x and Z (Gaussian) random fields and uses properties of the mutivariate random field as input to the statistical parametric mapping system. The present method and system identifies regions of anomalous/degraded crop health, records the numbers and size of these regions, quantifies the statistical significance of the size and number of anomalous regions relative to expected crop health and delineates regions of degraded crop health on a geographic map.

FIG. 1 is a flow chart of one embodiment of a computer implemented method for generating a map identifying the size and location of anomalous crop health patterns of a geographic area. Step S101 stores historical crop health images of a geographic area in a computer data base. Step S102 forecasts expected crop health of regions within the geographic area based on the historical crop health images of the geographic area using a predictive crop health forecasting computer modeling module. In one embodiment, the expected crop health forecast is also based on related covariates (e.g. weather forecasts). Step S103 generates expected crop health images. Step S104 obtains current crop health images of the geographic area. Step S105 defines differences in the expected crop health images and the current crop health images in a statistical parametric map using a statistical parametric mapping computer module. Step S106 identifies regions of anomalous crop health based on the modeled differences in the statistical parametric map. Step S107 determines the number of the identified anomalous crop health regions. Step S108 determines the size of each of the identified anomalous crop health regions. Step S109 quantifies the statistical significance of the size and number of the anomalous crop health regions relative to the expected crop health using the statistical parametric map. Step S110 generates a map of anomalous crop health patterns of the geographic area, the map delineating the anomalous crop health regions and the statistical significance of the size and number of the anomalous crop health regions.

In one embodiment of the method of FIG. 1, the predictive crop health forecasting computer modeling module includes one of a machine learning model, a statistical model and an artificial intelligence model. In addition, in one embodiment, the machine learning model is one of a support vector regression model, a random forest model and a generalized additive model. In one embodiment the statistical model is one of a multiple regression model, an auto-regressive model and a time series filtering model. In one embodiment the artificial intelligence model is one of recurrent neural networks, convolutional neural networks or other deep neural network.

The statistical parametric mapping requires a measure of uncertainty in the forecast and/or observed crop health. In one embodiment of the method of FIG. 1, a time series forecasting algorithm produces a confidence interval on the forecast crop health values. In one embodiment, the statistical parametric mapping module utilizes an uncertainty estimate for quantifying the statistical significance of the size and number of the anomalous crop health regions. In one embodiment, the predictive crop health forecasting computer modeling module includes a learning system to provide an uncertainty estimate in generating the expected crop health images.

Figure 2:
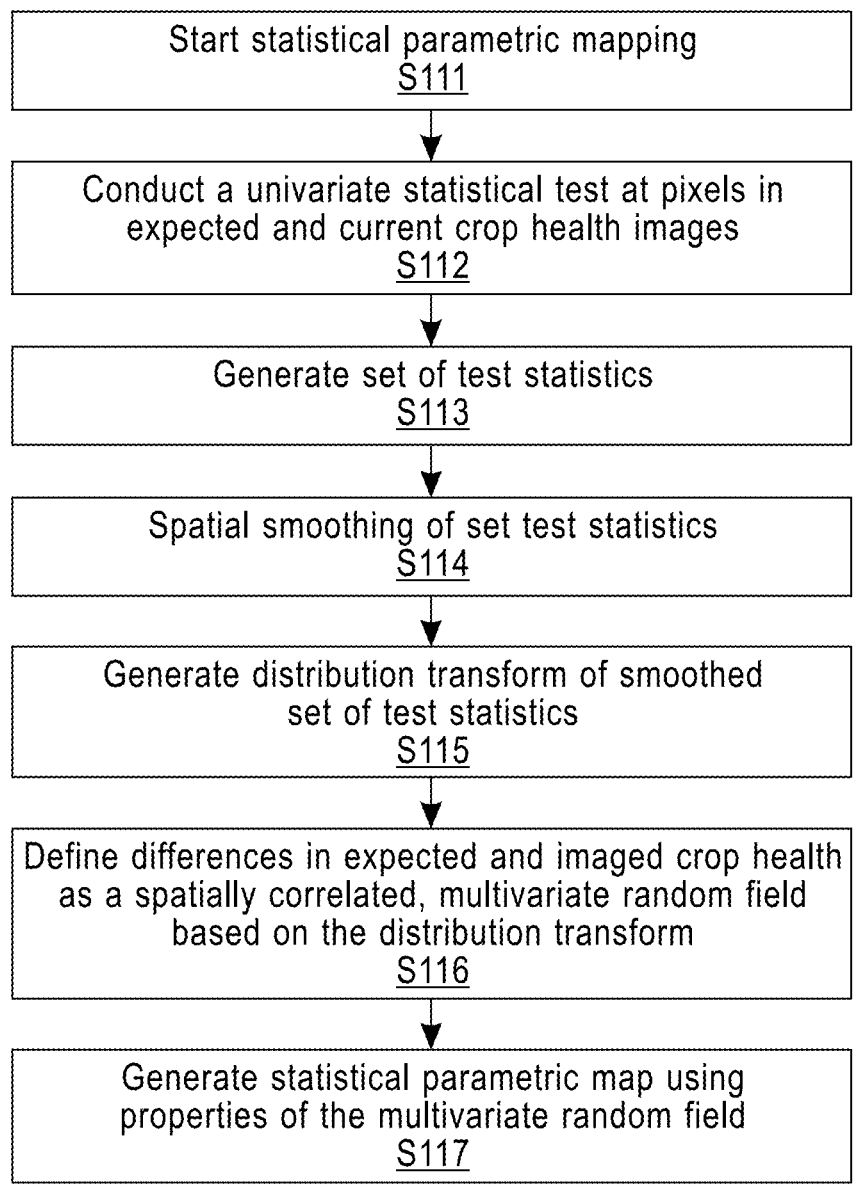
FIG. 2 is a flow diagram of one embodiment of a statistical parametric mapping method disclosed in this specification.

FIG. 2 is a flow chart of one embodiment of the modeling using the statistical parametric mapping module. Step S111 starts the statistical parametric mapping process. Step S112 conducts a univariate statistical test at all pixels of the expected crop health images and the current crop health images. Step S113 generates a set of test statistics. Step S114 performs spatial smoothing of the set of test statistics. Step S115 generates a distribution transform of the smoothed set of test statistics. Step S116 defines differences in expected and imaged crop health as a spatially correlated, multivariate random field that includes F, t, x and Z (Gaussian) random fields based on the distribution transform. Step 117 generates the statistical parametric map using properties of the mutivariate random field and the transformed distribution transform of the smoothed set of test statistics.

Figure 3:
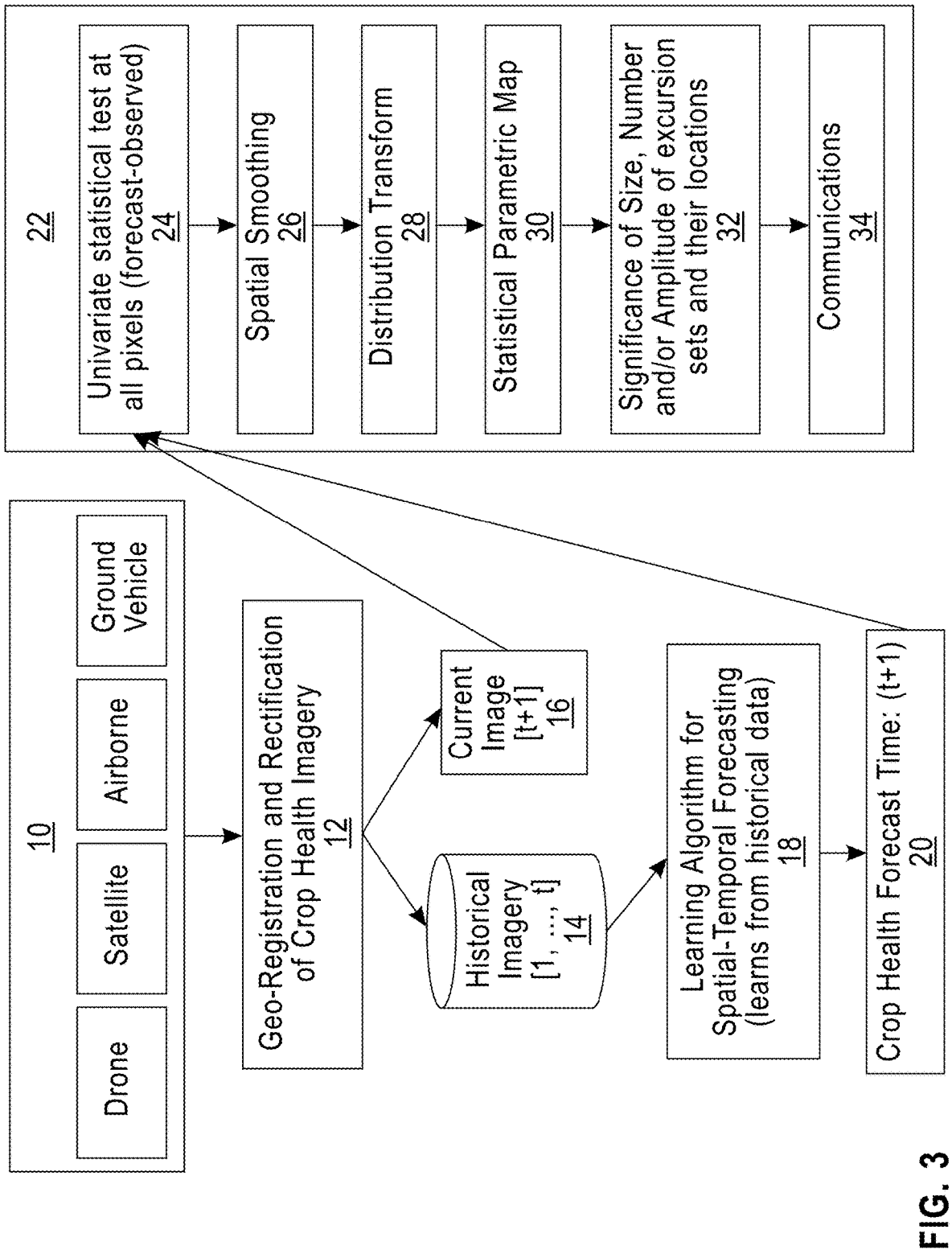
FIG. 3 an illustrative diagram of one embodiment of the system for identifying anomalous crop health regions disclosed in this specification.

FIG. 3 is a block diagram of one embodiment of a system for generating a map identifying the size and location of anomalous crop health patterns of a geographic area. Data acquisition module 10 obtains the imagery from various sources, such as drones, satellites, aircraft or ground-based platforms. A geo-registration and ortho-rectification crop health imagery module 12 transmits the output imagery to a database 14 of historical imagery taken at times [1, . . . , t] and a database 16 of current images at time [t+1]. A spatial-temporal forecasting module 18 uses statistical and machine learning algorithms that use the historical data to generate a crop health forecast 20 at time (t+1). Module 18 may be incorporated in program module 120 of FIG. 5 described below.

The current image data from database 16 and the resulting forecast from the Forecast module (20) are input to statistical parametric mapping module 22. Statistical parametric mapping module 22 may be incorporated in program module 120 of FIG. 5 described below. In statistical test module 24 a set of univariate statistical tests is conducted at every pixel of the forecast and currently observed images to provide a test-statistic at every pixel. In spatial smoothing module 26 that spatial representation of test statistics is then smoothed. Distribution transform module 28 generates a distribution transform of the set of test statistics and the distribution re-inflated. In one alternative embodiment, the re-inflation of the distribution is not done because all subsequent calculations and results are relative to the standard deviation of the distribution and therefore, the same process can be done using the standard deviation of the distribution after the smoothing. However, re-inflation is done because it is generally easier to work with, and understand, results when the final SPM has unit (1.0) standard deviation. Module 30 defines differences in the expected crop health images and the current crop health images to generate a statistical parametric map. Module 32 quantifies the significance of the size, number and/or amplitude of excursion sets and their locations. Communications module 34 generates a geographic area map of anomalous crop health patterns. The map delineating the anomalous crop health regions and the statistical significance of the size and number of the anomalous crop health regions. The map is communicated to the user and other interested persons or entities.

One example of an application of the present method and system is in soil moisture deficit. Soil moisture deficit leads to decreased plant growth. Soil moisture deficit may be a localized phenomena such as in an irrigated field where irrigation problems impact a portion of the field or it may be widespread where the entire crop growing region is impacted by the moisture deficit as is more commonly exhibited in a non-irrigated growing region. The present method and system is capable of detecting either expression of soil moisture deficit and differentiating between the two.

Another example of an application of the present method and system is in nitrogen deficit. Readily available nitrogen in the soil is necessary for plant growth. In areas with limited nitrogen supply, the chlorophyll level of the plants is reduced and this decrease in chlorophyll is detectable by airborne imagery and apparent in the normalized difference vegetation index (NDVI) that is derived from this imagery. The present method and system can compare NDVI derived from the current imagery and compare that to expected NDVI values and identify regions of significant deviation from expected values.

Another example of an application of the present method and system is in pestilence. A wide array of pests can alter plant growth. The types of pestilence and the mechanisms with which they alter plant growth vary across the combinations of pests and the plants. These mechanisms range from creating mutations at the sub-cellular level to parasitic growth of another plant onto the crop. However, because all of these expressions of pestilence alter the crop health by decreasing green chlorophyll, they are detectable through airborne imaging. Significant deviations from expected crop health expressed within the imagery can be detected and localized with the present method and system.

Figure 4:
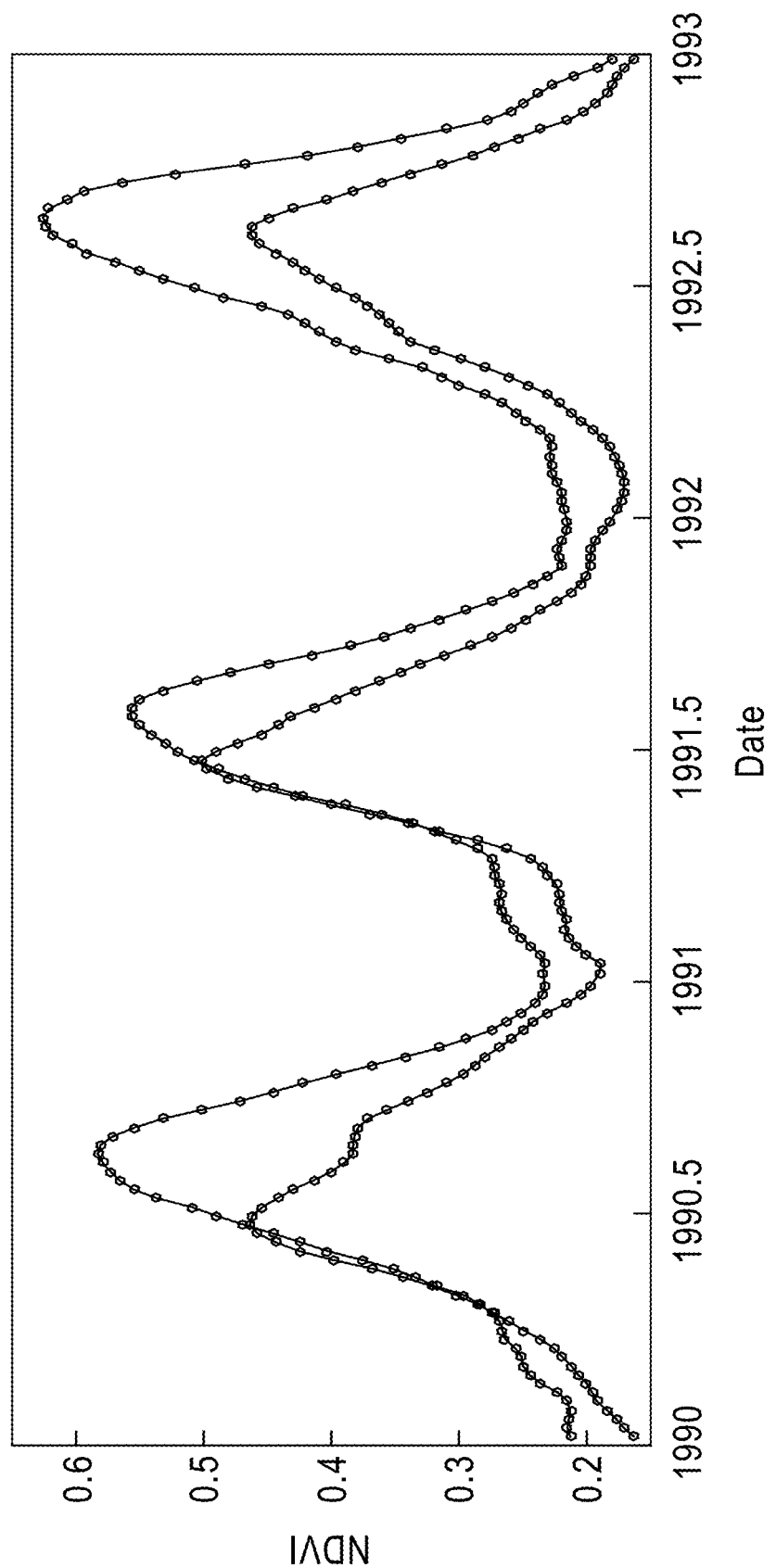
FIG. 4 is a graph of weekly NDVI observations for three locations in central USA over 3 years.
Figure 5:
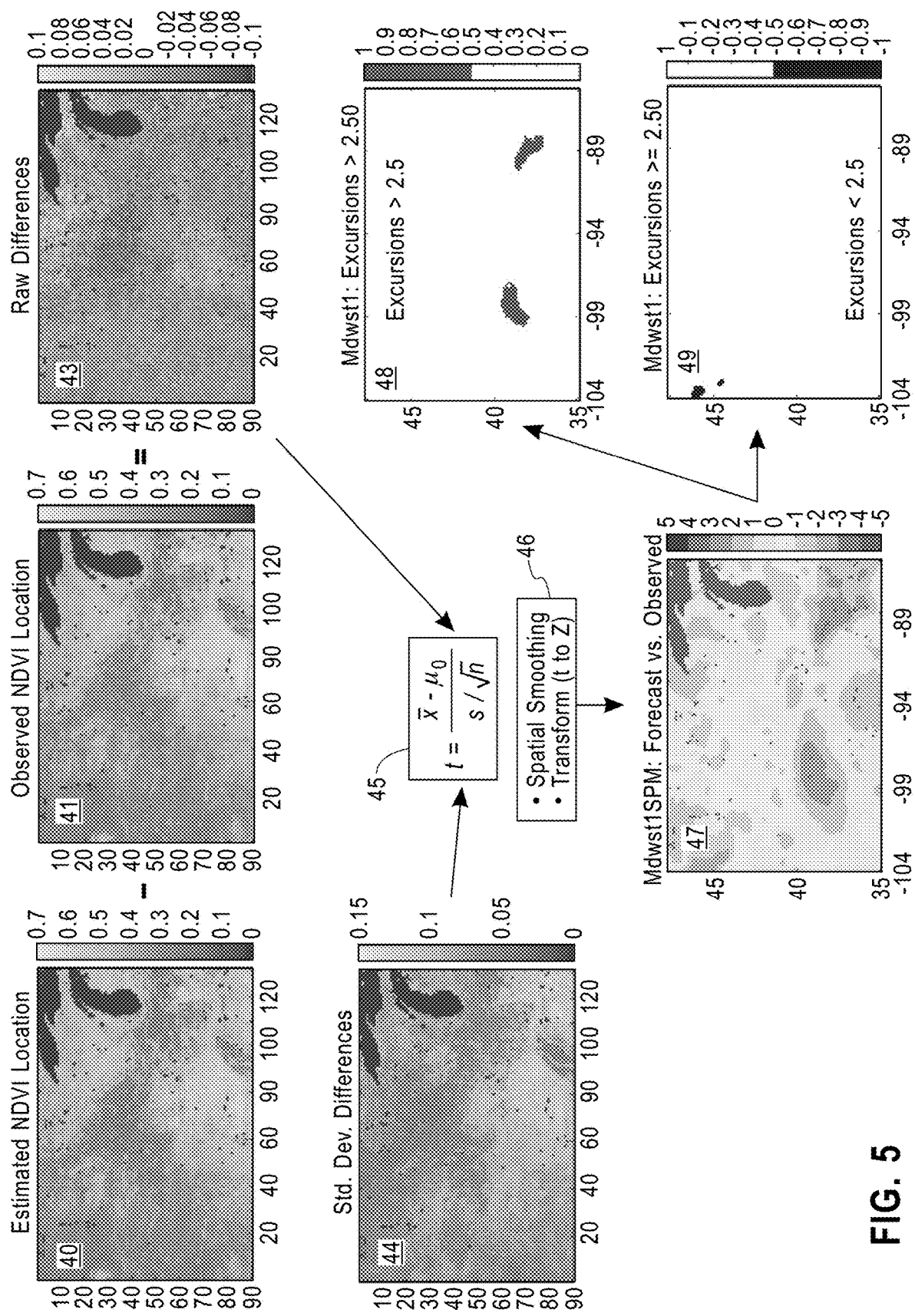
FIG. 5 is an illustration of one example of the application of the method and system disclosed in the specification.

FIGS. 4 and 5 show an illustrative example of how statistical parametric mapping is applied to identify regions of anomalous crop growth for NDVI measures of the Midwest, USA. NDVI measures absorbance of light in the visual spectrum by chlorophyll and scattering of light in the near-infrared by other plant material and is used as general measure of vegetation health.

The graph of FIG. 4 shows weekly NDVI observations for three locations in central US over 3 years. The satellite images available for analysis in the Midwest US have a 16×16 km pixel resolution. The coarse resolution aggregates multiple crop types and non-crop land area into a single pixel. Ideal conditions are image resolution of meters to 10's of meters and a single crop. This example calculation is done at a much coarser scale for illustrative purposes only.

A simple linear filter is used as the example predictive model. This filter is applied as a time series forecast at every pixel and is independent of neighboring pixels. Other time-series forecasting models can be fit to these historical data. The use of more sophisticated time-series forecasts can be employed in the present method and system.

The distribution of forecast errors is assumed Gaussian and used to derive the pixel-wise standard deviation used in the statistical test. In this example, a t-test is used as the pixel-wise (univariate) test. The images are available weekly and the forecast is shown for a single week. The sequence of maps generated in the example SPM process are shown in the FIG. 5. Map 40 shows estimated NDVI obtained from the predictive forecasting model. Map 41 is the NDVI map observed from current imagery. Map 43 shows the raw differences between the estimated and observed NDVI locations. Map 44 is the standard deviation of those differences from the estimated NDVI location. The data from maps 43 and 44 are input to the univariate t-test module 45 which employs the equation:

$$t = \frac{\bar{x} - \mu_0}{s/\sqrt{n}}$$

Module 46 performs spatial smoothing and generates a distribution transform (t to Z).

Map 47 shows the resulting statistical parametric map.

Map 47 has a spatial correlation length (Full Width at Half-Maximum) of 11.4 pixels in the east-west direction and 8.9 pixels in the north-south. SPM is a multivariate Gaussian field and color legend is standard deviations from the zero-mean SPM is truncated at a threshold of +/−2.5. Excursions above the threshold are shown in map 48 and excursions below the threshold are shown in map 49. Several regions of potential poor crop health are identified as excursions outside the threshold. The largest excursions are examined for significance.

The statistical parametric map calculation is shown below. The level inference for excursion regions is set.

$$P_w(u, k, c) \approx 1 - \sum_{i=0}^{c-1} \sum_{j=1}^{\infty} P(m=j) \cdot \binom{j}{i} \cdot P(n \geq k)^i \cdot P(n<k)^{j-1} \approx$$

$$1 - \sum_{i=0}^{c-1} \lambda(i, E[m] \cdot P(n \geq k))$$

P(u,k,c)=Probability of getting >=c regions, each of size >=k pixels, above the threshold u in an area of size S from a multiGaussian field with spatial correlation of W.

m=number of regions above a threshold u n=number of pixels above a threshold u

E[m]=Expected value of number of regions (Euler characteristic)

=Poisson pdf

P(n≥k)

The largest positive excursion is 122 pixels. For a multivariate Gaussian field with the calculated FWHM truncated at a threshold of 2.5, the probability of getting an excursion of this size (p-value) is 0.054 (close, but not significant at an α=0.050 level). The largest negative excursion is 25 pixels. For a multivariate Gaussian field with the calculated FWHM truncated at a threshold of −2.5, the probability of getting an excursion of this size (p-value) is 0.650 (not significant at an α=0.050 level). The conclusion reached on these data is that there are regions of potential unexpected crop health, but they are not significantly different from forecast crop health.

Figure 6:
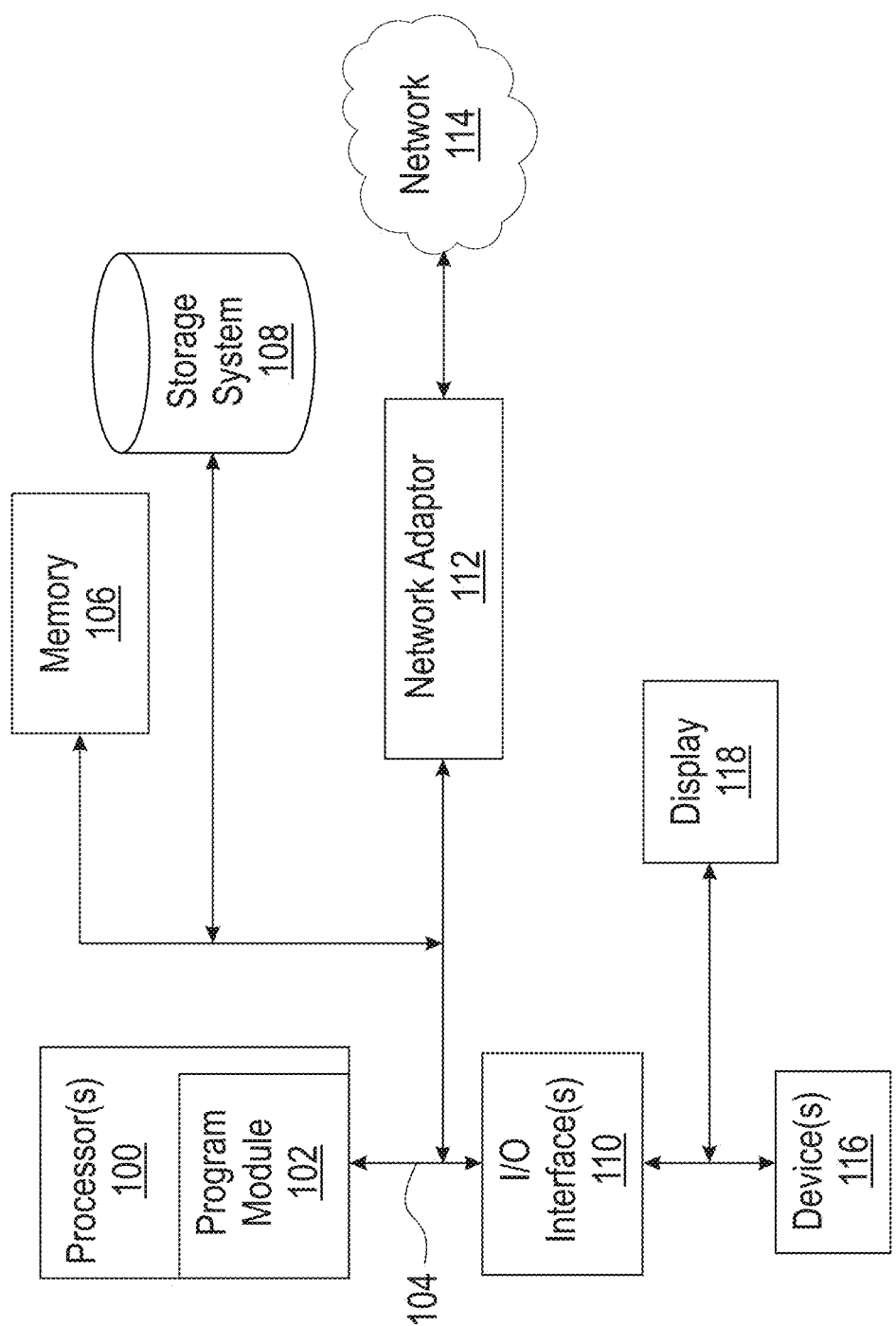
FIG. 6 is a block diagram of an exemplary computing system suitable for implementation of the embodiments disclosed in this specification.

FIG. 6 illustrates a schematic of an example computer or processing system that may implement the method for generating a map identifying the size and location of anomalous crop health patterns of a geographic area comprising in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for generating a map identifying the size and location of anomalous crop health patterns of a geographic area, comprising: storing historical crop health images of a geographic area in a computer data base; forecasting expected crop health of regions within the geographic area based on the historical crop health images of the geographic area using a predictive crop health forecasting computer modeling module to generate expected crop health images; obtaining current crop health images of the geographic area; modeling differences in the expected crop health images and the current observed crop health images in a statistical parametric map using a statistical parametric mapping computer module; identifying regions of anomalous crop health based on the modeled differences in the statistical parametric map; determining the number of the identified anomalous crop health regions; determining the size of each of the identified anomalous crop health regions; quantifying statistical significance of the size and number of the anomalous crop health regions relative to the expected crop health using the statistical parametric map; and generating a geographic area map of anomalous crop health patterns, the map delineating the anomalous crop health regions and the statistical significance of the size and number of the anomalous crop health regions; wherein the modeling using the statistical parametric mapping module comprises: conducting a univariate statistical test at all pixels of the expected crop health images and the current crop health images to generate a set of test statistics; perform spatial smoothing of the set of test statistics; generate a distribution transform of the smoothed set of test statistics; modeling differences in expected and imaged crop health as a spatially correlation, multivariate random field that includes F, t, x and Z (Gaussian) random fields based on the distribution transform; and generate the statistical parametric map using properties of the multivariate random field and the distribution transform of the smoothed set of test statistics.

2. The computer implemented method of claim 1, wherein the predictive crop health forecasting computer modeling module includes one of a machine learning model, a statistical model and an artificial intelligence model.

3. The computer implemented method of claim 2, wherein the machine learning model is one of a support vector regression model, random forest model and a generalized additive model, wherein the statistical model is one of a multiple regression model, an auto-regressive model and a time series filtering model, and wherein the artificial intelligence model is one of recurrent neural networks, convolutional neural networks or other deep learning approaches.

4. The computer implemented method of claim 1, wherein the statistical parametric mapping module utilizes an uncertainty estimate for quantifying the statistical significance of the size and number of the anomalous crop health regions.

5. The computer implemented method of claim 1, wherein the predictive crop health forecasting computer modeling module includes a learning system to provide an uncertainty estimate in generating the expected crop health images.

6. A computer system for generating a map identifying the size and location of anomalous crop health patterns of a geographic area, comprising: one or more computer processors; one or more non-transitory computer-readable storage media; program instructions, stored on the one or more non-transitory computer-readable storage media, which when implemented by the one or more processors, cause the computer system to perform the steps of: storing historical crop health images of a geographic area in a computer data base; forecasting expected crop health of regions within the geographic area based on the historical crop health images of the geographic area using a predictive crop health forecasting computer modeling module to generate expected crop health images; obtaining current crop health images of the geographic area; modeling differences in the expected crop health images and the current observed crop health images in a statistical parametric map using a statistical parametric mapping computer module; identifying regions of anomalous crop health based on the modeled differences in the statistical parametric map; determining the number of the identified anomalous crop health regions; determining the size of each of the identified anomalous crop health regions; quantifying statistical significance of the size and number of the anomalous crop health regions relative to the expected crop health using the statistical parametric map; and generating a geographic area map of anomalous crop health patterns, the map delineating the anomalous crop health regions and the statistical significance of the size and number of the anomalous crop health regions; wherein the modeling using the statistical parametric mapping module comprises: conducting a univariate statistical test at all pixels of the expected crop health images and the current crop health images to generate a set of test statistics: perform spatial smoothing of the set of test statistics; generate a distribution transform of the smoothed set of test statistics: modeling differences in expected and imaged crop health as a spatially correlation, multivariate random field that includes F, t, y, and Z (Gaussian) random fields based on the distribution transform: and generate the statistical parametric map using properties of the multivariate random field and the distribution transform of the smoothed set of test statistics.

7. The computer system of claim 6, wherein the predictive crop health forecasting computer modeling module includes one of a machine learning model, a statistical model and an artificial intelligence model.

8. The computer system of claim 7, wherein the machine learning model is one of a support vector regression model, a random forest model and a generalized additive model, wherein the statistical model is one of a multiple regression model, an auto-regressive model and a time series filtering model, and wherein the artificial intelligence model is one of recurrent neural networks, convolutional neural networks or other deep learning approaches.

9. The computer system of claim 6, wherein the statistical parametric mapping module utilizes an uncertainty estimate for quantifying the statistical significance of the size and number of the anomalous crop health regions.

10. The computer system of claim 6, wherein the predictive crop health forecasting computer modeling module includes a learning system to provide an uncertainty estimate in generating the expected crop health images.

11. A computer program product comprising: program instructions on a computer-readable storage medium, where execution of the program instructions using a computer causes the computer to perform a method for generating a map identifying the size and location of anomalous crop health patterns of a geographic area, comprising: storing historical crop health images of a geographic area in a computer data base; forecasting expected crop health of regions within the geographic area based on the historical crop health images of the geographic area using a predictive crop health forecasting computer modeling module to generate expected crop health images; obtaining current crop health images of the geographic area; modeling differences in the expected crop health images and the current observed crop health images in a statistical parametric map using a statistical parametric mapping computer module; identifying regions of anomalous crop health based on the modeled differences in the statistical parametric map; determining the number of the identified anomalous crop health regions; determining the size of each of the identified anomalous crop health regions; quantifying statistical significance of the size and number of the anomalous crop health regions relative to the expected crop health using the statistical parametric map; and generating a geographic area map of anomalous crop health patterns, the map delineating the anomalous crop health regions and the statistical significance of the size and number of the anomalous crop health regions; wherein the modeling using the statistical parametric mapping module comprises: conducting a univariate statistical test at all pixels of the expected crop health images and the current crop health images to generate a set of test statistics: perform spatial smoothing of the set of test statistics; generate a distribution transform of the smoothed set of test statistics: modeling differences in expected and imaged crop health as a spatially correlation multivariate random field that includes F, t, x and Z (Gaussian) random fields based on the distribution transform: and generate the statistical parametric map using properties of the multivariate random held and the distribution transform of the smoothed set of test statistics.

12. The computer program product of claim 11, wherein the predictive crop health forecasting computer modeling module includes one of a machine learning model, a statistical model and an artificial intelligence model.

13. The computer program product of claim 12, wherein the machine learning model is one of a support vector regression model, a random forest model and a generalized additive model, wherein the statistical model is one of a multiple regression model, an auto-regressive model and a time series filtering model, and wherein the artificial intelligence model
is one of recurrent neural networks, convolutional neural networks or other deep learning approaches.

14. The computer program product of claim 11, wherein the statistical parametric mapping module utilizes an uncertainty estimate for quantifying the statistical significance of the size and number of the anomalous crop health regions.

15. The computer program product of claim 11, wherein the predictive crop health forecasting computer modeling module includes a learning system to provide an uncertainty estimate in generating the expected crop health images.

* * * * *